US012789285B2

(12) United States Patent
Matsuura et al.

(10) Patent No.: US 12,789,285 B2
(45) Date of Patent: Nov. 10, 2026

(54) BONDING DEVICE AND BONDING METHOD

(71) Applicant: Honda Motor Co., Ltd., Tokyo (JP)

(72) Inventors: Satoshi Matsuura, Tokyo (JP); Toshihide Sunada, Tokyo (JP); Yoichi Kamiyama, Tokyo (JP); Isamu Mano, Tokyo (JP); Yotaro Ikeda, Tokyo (JP); Yoshihiro Kikima, Tokyo (JP); Yusuke Ogawa, Tokyo (JP); Kotaro Tobinobu, Tokyo (JP); Tetsuya Saito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/241,417

(22) Filed: Jun. 18, 2025

(65) Prior Publication Data

US 2026/0077425 A1 Mar. 19, 2026

(30) Foreign Application Priority Data

Sep. 18, 2024 (CN) ......................... 202411296967.9

(51) Int. Cl.
*B23K 20/00* (2006.01)
*B23K 20/12* (2006.01)
(Continued)

(52) U.S. Cl.
CPC ........ *B23K 20/1245* (2013.01); *B23K 20/123* (2013.01); *B23K 37/04* (2013.01)

(58) Field of Classification Search
CPC .............. B23K 20/1245; B23K 20/123; B23K 20/122–1295; B23K 37/04–047
(Continued)

(56) References Cited

U.S. PATENT DOCUMENTS 2,417,144 A * 3/1947 Trimble ............. B23K 37/0443 269/106
3,530,272 A * 9/1970 Roper .................. B23K 9/0026 219/124.4
(Continued)

FOREIGN PATENT DOCUMENTS

CN 106112371 A * 11/2016 ........... B23K 37/047
CN 107030431 A * 8/2017 ......... B23K 37/0435
(Continued)

*Primary Examiner* — Kiley S Stoner
(74) *Attorney, Agent, or Firm* — JCIPRNET

(57) ABSTRACT

A bonding device bonds a workpiece having a U-shaped cross-section and face and corner portions, and includes: an abutting component abutting the workpiece in a first direction; a pressing component pressing the workpiece in a second direction to fix the workpiece; a control component controlling the abutting and pressing components. The pressing component includes a face portion pressing component pressing the face portion and a corner portion pressing component pressing the corner portion. The abutting component moves to abut the workpiece, and the pressing component moves to press the workpiece in a state in which the abutting component is moved. A sequence of the control component controlling the pressing component to move includes: controlling the corner portion pressing component to move to press the corner portion, then controlling the face portion pressing component to move to press the face portion. A bonding method includes abutting and pressing steps.

5 Claims, 3 Drawing Sheets

(51) Int. Cl.
*B23K 37/00* (2025.01)
*B23K 37/04* (2006.01)

(58) Field of Classification Search
USPC ............. 228/112.1–114.5, 212–213, 2.1–2.3, 228/44.3–49.5
See application file for complete search history.

(56) References Cited

U.S. PATENT DOCUMENTS

| | | | | | |
|---|---|---|---|---|---|
| 3,609,277 | A * | 9/1971 | Dallet | B23K 1/20 219/615 |
| 3,754,109 | A * | 8/1973 | Moulin | B23K 1/002 219/615 |
| 4,107,506 | A * | 8/1978 | Pelegri | B23K 1/002 219/616 |
| 4,224,494 | A * | 9/1980 | Reboux | A47J 27/002 219/676 |
| 4,598,854 | A * | 7/1986 | Franke | B23K 37/0452 228/184 |
| 2004/0129757 | A1 * | 7/2004 | Toba | B23K 37/0443 228/49.1 |
| 2015/0034214 | A1 * | 2/2015 | Thakur | B23K 20/1275 228/2.1 |
| 2026/0077425 | A1 * | 3/2026 | Matsuura | B23K 20/123 |

FOREIGN PATENT DOCUMENTS

| | | | | | |
|---|---|---|---|---|---|
| CN | 106826062 | B * | 4/2018 | B23K 37/0443 |
| CN | 106583999 | B * | 6/2018 | B23K 37/0435 |
| CN | 109318004 | A * | 2/2019 | B23K 37/0435 |
| CN | 113770624 | A * | 12/2021 | B23K 37/0443 |
| CN | 113953755 | A * | 1/2022 | B23K 11/11 |
| CN | 115255594 | A * | 11/2022 | B23K 15/0006 |
| CN | 117548958 | A * | 2/2024 | B23K 37/0435 |
| CN | 120133835 | A * | 6/2025 | B23K 37/0443 |
| CN | 120155711 | A * | 6/2025 | B23K 37/04 |
| JP | H11291068 | A * | 10/1999 | B23K 33/00 |
| JP | 2000176581 | A * | 6/2000 | B23K 20/122 |
| JP | 2005059101 | A * | 3/2005 | B23K 20/126 |
| JP | 2023073646 | | 5/2023 | |
| KR | 200352538 | Y1 * | 6/2004 | B23K 20/021 |

* cited by examiner

BONDING DEVICE AND BONDING METHOD

CROSS-REFERENCE TO RELATED APPLICATION

This application claims the priority benefit of China application serial no. 202411296967.9 filed on Sep. 18, 2024. The entirety of the above-mentioned patent application is hereby incorporated by reference herein and made a part of this specification.

BACKGROUND OF THE INVENTION

Field of the Invention

The invention relates to a bonding device and a bonding method.

Description of Related Art

In recent years, in order to ensure access to affordable, reliable, sustainable, and advanced energy for more people, research and development related to battery modules contributing to energy efficiency are currently in progress. However, in a technique related to the battery module, the casing structure used for the battery module is an issue.

In the prior art, a battery module generally uses a casing to accommodate battery cells and the like. The casing of the battery module, for example, includes two workpieces formed by die casting and having a U-shaped cross-section as a front component and a rear component. The U-shaped cross-sections of the two workpieces are connected to each other and then bonded, thereby combining the two workpieces into a portion of the casing of the battery module. Due to factors such as dimensional tolerances or uneven cross-sections between workpieces, there is a gap between the workpieces connected to each other, so that there may be some areas where the bonding is not completed, resulting in a low bonding effect of the workpieces. In this regard, currently, the workpiece may also be pressed and fixed during the bonding process in order to reduce the influence of factors such as dimensional tolerance or cross-sectional unevenness to eliminate the gap. For example, a substantially planar face portion of a workpiece may be pressed to facilitate flatter and easier bonding. However, a workpiece having a U-shaped cross-section has a substantially flat face portion and a curved corner portion. If only the face portion of the workpiece is pressed, it is difficult to eliminate the gap at the corner portion, resulting in low bonding effect of the workpiece (especially in the area near the corner portion).

PRIOR ART LITERATURE

Patent Literature

[Patent Document 1] Japanese Patent Publication No. 2023-73646

SUMMARY OF THE INVENTION

The invention aims to solve the above issues and to improve the bonding effect of the workpiece. Furthermore, the invention contributes to energy efficiency.

The invention provides a bonding device that may improve the bonding effect of a workpiece.

According to an embodiment of the invention, a bonding device is used to bond a workpiece having a U-shaped cross-section and having a face portion and a corner portion, and includes: an abutting component abutting the workpiece in a first direction; a pressing component pressing the workpiece in a second direction different from the first direction, thereby fixing the workpiece; and a control component controlling the abutting component and the pressing component. In particular, the pressing component includes a face portion pressing component pressing the face portion of the workpiece and a corner portion pressing component pressing the corner portion of the workpiece. The control component controls the abutting component to move to abut the workpiece, and controls the pressing component to move to press the workpiece in a state in which the abutting component is moved. Furthermore, a sequence of the control component controlling the pressing component to move includes: first controlling the corner portion pressing component to move to press the corner portion, and then controlling the face portion pressing component to move to press the face portion.

The invention further provides a bonding method that may improve the bonding effect of a workpiece.

According to an embodiment of the invention, a bonding method is used to bond a workpiece having a U-shaped cross-section and having a face portion and a corner portion, and includes: an abutting step of abutting the workpiece in a first direction; and a pressing step of pressing the workpiece in a second direction different from the first direction, thereby fixing the workpiece. In particular, the abutting step is performed to abut the workpiece, and in a state in which the abutting step is performed, the pressing step is performed to press the workpiece. Moreover, a sequence of performing the pressing step includes: first pressing the corner portion and then pressing the face portion.

Based on the above, in the bonding device and the bonding method of the invention, in the state in which the abutting component is moved to abut the workpiece (the abutting step is performed), the control component controls the pressing component to move to press the workpiece (perform the pressing step). Furthermore, the sequence of the control component controlling the pressing component to move (perform the pressing step) includes: first controlling the corner portion pressing component to move to press the corner portion, and then controlling the face portion pressing component to move to press the face portion. Therefore, it may be seen that the bonding device and the bonding method are used to bond the workpiece having the U-shaped cross-section and having the face portion and the corner portion, and during the bonding process, the corner portion of the workpiece is pressed first to eliminate the gap at the corner portion, and then the face portion of the workpiece is pressed in the state in which the corner portion is pressed and fixed. In this way, the gap generated at the corner portion of the workpiece may be significantly reduced, thereby facilitating bonding. Accordingly, the bonding device and the bonding method of the invention may improve the bonding effect of the workpiece.

In order to make the above features and advantages of the invention better understood, embodiments are specifically provided below with reference to figures for detailed description as follows.

DESCRIPTION OF THE EMBODIMENTS

Figure 1:
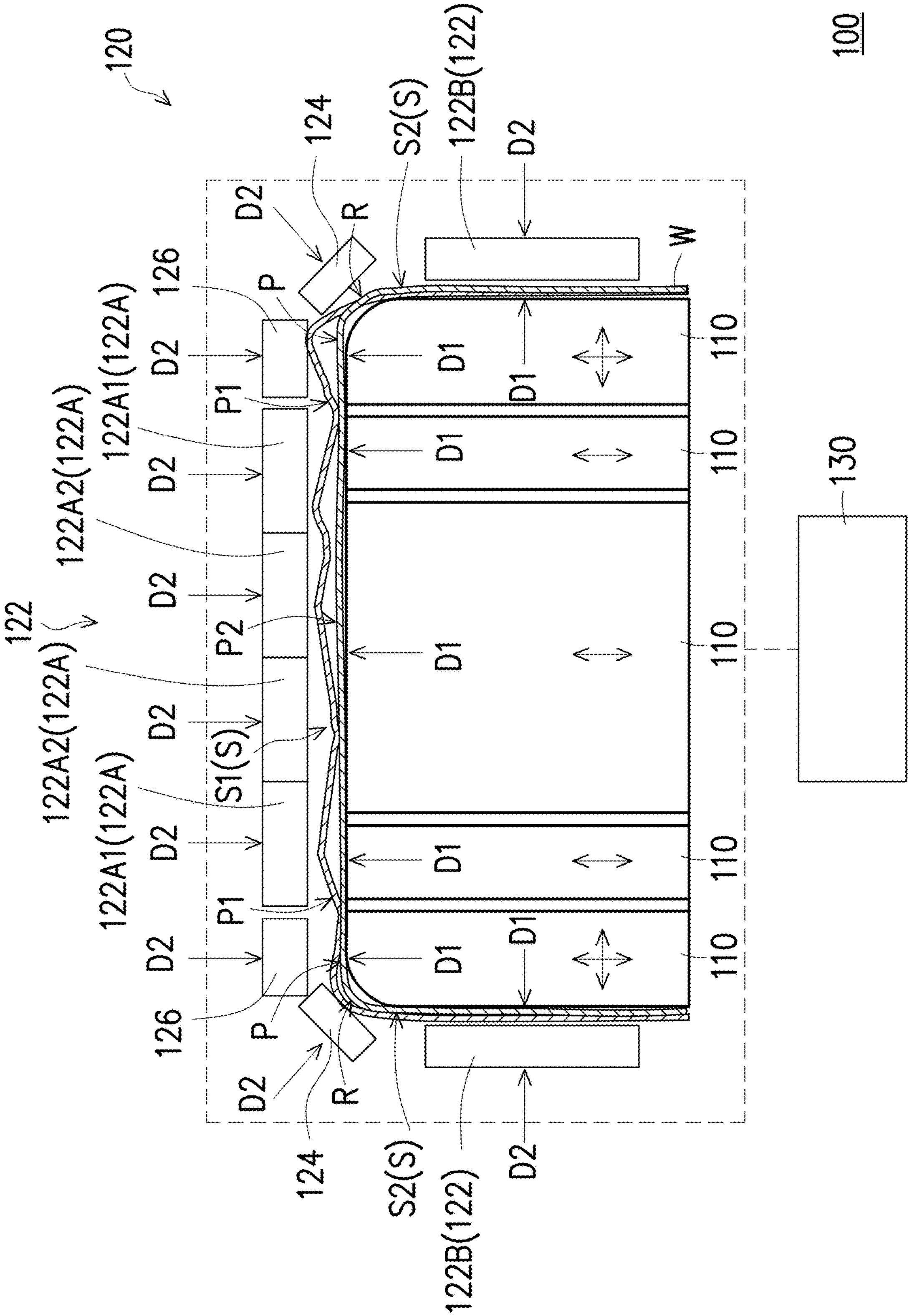
FIG. 1 is a schematic diagram of the operation of a bonding device of an embodiment of the invention when used to bond a workpiece.
Figure 2:
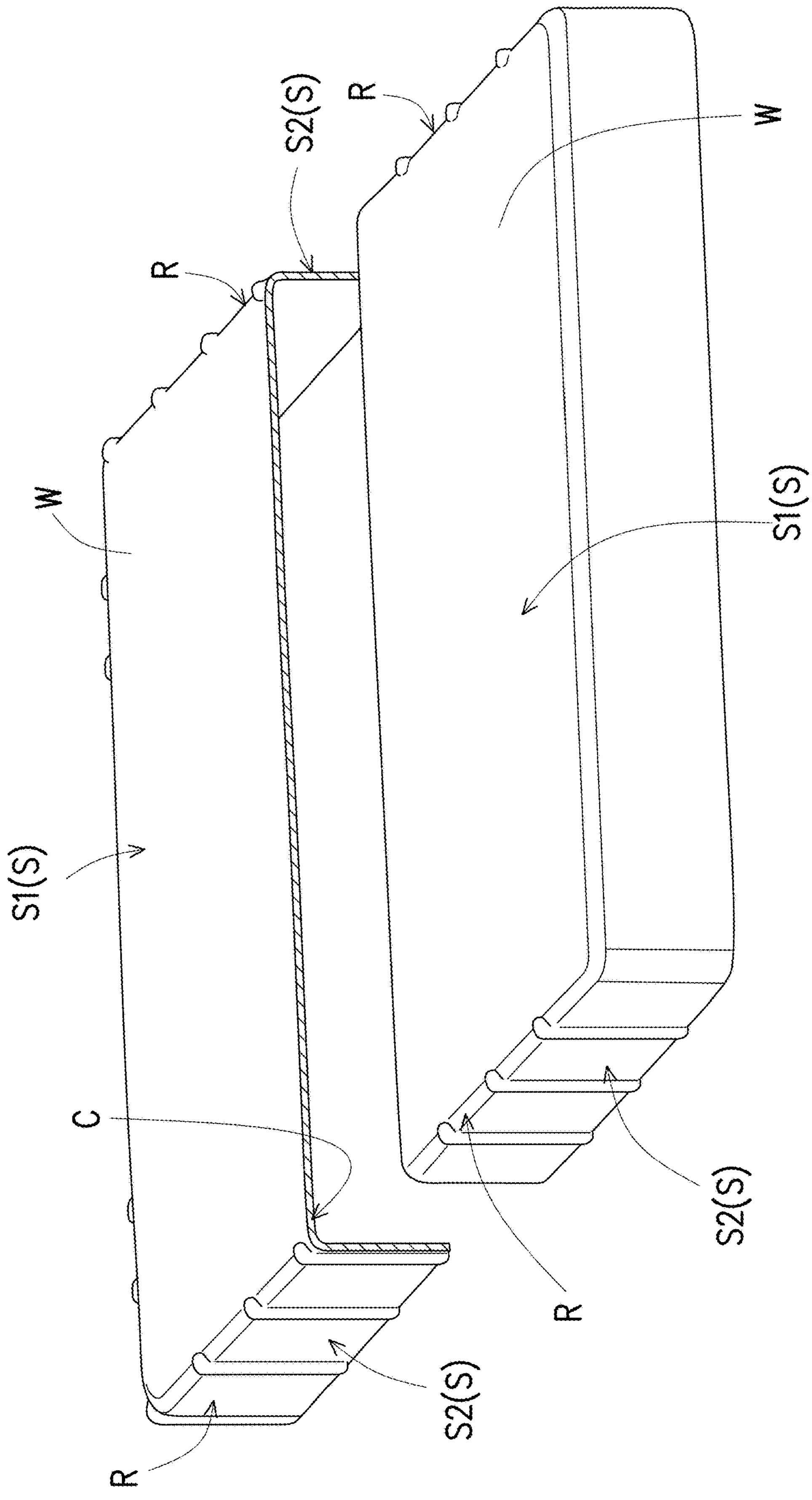
FIG. 2 is a perspective schematic diagram of a workpiece to which the bonding device shown in FIG. 1 is applicable.
Figure 3:
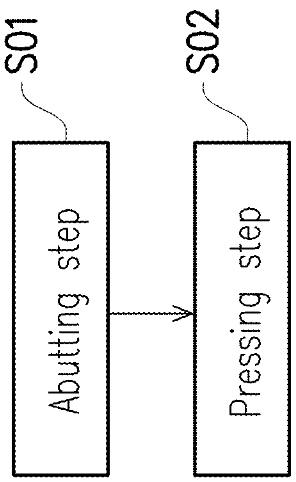
FIG. 3 is an operation flowchart of the bonding method of an embodiment of the invention.

Reference will now be made in detail to the exemplary embodiments of the disclosure, examples of which are illustrated in the accompanying drawings. In particular, FIG. 1 is a schematic diagram of the operation of the bonding device of an embodiment of the invention when used to bond a workpiece, FIG. 2 is a perspective schematic diagram of a workpiece to which the bonding device shown in FIG. 1 is applicable, and FIG. 3 is an operation flowchart of the bonding method of an embodiment of the invention. The specific structure of a bonding device 100 and the operation flow of the bonding method of the present embodiment are described below with reference to FIG. 1 to FIG. 3, but these are only one example and the invention is not limited thereto and may be adjusted according to needs.

Referring to FIG. 1 and FIG. 2, in the present embodiment, the bonding device 100 is used to bond a workpiece W having a U-shaped cross-section and having a face portion S and a corner portion R, and includes an abutting component 110, a pressing component 120, and a control component 130. The abutting component 110 abuts the workpiece W in a first direction D1. The pressing component 120 presses the workpiece W in a second direction D2 different from the first direction D1, thereby fixing the workpiece W. The control component 130 controls the abutting component 110 and the pressing component 120. In particular, the pressing component 120 includes a face portion pressing component 122 pressing the face portion S of the workpiece W and a corner portion pressing component 124 pressing the corner portion R of the workpiece W. The control component 130 is, for example, an electronic control unit or a processor electrically connected to the abutting component 110 and the pressing component 120 to transmit a control signal. The control component 130 controls the abutting component 110 to move to abut the workpiece W, and controls the pressing component 120 to move to press the workpiece W in a state in which the abutting component 110 is moved. Furthermore, the sequence of the control component 130 controlling the pressing component 120 to move includes: first controlling the corner portion pressing component 124 to move to press the corner portion R, and then controlling the face portion pressing component 122 to move to press the face portion S.

Specifically, in the present embodiment, as shown in FIG. 2, bonding the workpiece W means that two workpieces W formed by die casting and having the U-shaped cross-section C are used as a front component and a rear component, and the U-shaped cross-sections C of the two workpieces W abut each other and then the cross-sections C are bonded (FIG. 2 shows the two workpieces W before abutting each other), thereby combining the two workpieces W into a single component (for example, a portion of the outer casing of a battery module). In this way, as shown in FIG. 1, the bonding device 100 simultaneously performs the abutting and pressing on the two workpieces W for which the U-shaped cross-sections C abut each other (FIG. 1 shows a state in which there is a gap between the workpieces W before the abutting component 110 and the pressing component 120 perform abutting and pressing), so as to facilitate the bonding of the U-shaped cross-sections C of the two workpieces W connected to each other. However, in other embodiments not shown, the bonding device 100 may also bond a single workpiece W, as long as the workpiece W is a component having the U-shaped cross-section C and having the face portion S and the corner portion R. The invention does not limit the application of the bonding device 100, which may be adjusted according to needs.

As an example, in the present embodiment, as shown in FIG. 1, the abutting component 110 is, for example, a plurality of movable components in a loading table (not shown) for loading the workpiece W, wherein the abutting component 110 located in the middle is, for example, movable in the up-down direction and abuts the workpiece W with the up direction as the first direction D1, and the abutting components 110 located at the relative two outer sides are, for example, movable in the up-down direction and the left-right direction and abut the workpiece W with the up direction and the outer side direction as the first direction D1 (as indicated by the arrows in FIG. 1). Correspondingly, the pressing component 120 is, for example, a plurality of movable components disposed relative to a loading platform on which the workpiece W is loaded, wherein the pressing component 120 located in the middle is, for example, movable in the up-down direction and presses the workpiece W with the down direction as the second direction D2, and the pressing components 120 located at the relative two outer sides are, for example, movable in the up-down direction and the left-right direction and press the workpiece W with the down direction and the inner side direction as the second direction D2 (as indicated by the arrows in FIG. 1). That is, the first direction D1 and the second direction D2 are set according to the actual positions of the abutting component 110 and the pressing component 120, and are preferably opposite to each other, so as to fix the workpiece W between the abutting component 110 and the pressing component 120. In this way, the abutting component 110 located in the middle and the pressing component 120 located in the middle fix the middle portion of the workpiece W, for example, in the up-down direction, and the abutting component 110 located at the relative two outer sides and the pressing component 120 located at the relative two outer sides fix the portions of the relative two outer sides of the workpiece W, for example, in the up-down direction and the left-right direction.

Furthermore, in the present embodiment, as shown in FIG. 1, the abutting component 110 is preferably disposed at the concave side of the workpiece W having the U-shaped cross-section (for example, the lower side in the figure), and the pressing component 120 is preferably disposed at the convex side of the workpiece W having the U-shaped cross-section (for example, the upper side in the figure). In this way, the control component 130 controls the abutting component 110 to move to abut the workpiece W, and in particular, to abut the workpiece W from the concave side of the workpiece W to pre-position the workpiece W. Then, in a state in which the abutting component 110 is moved, the control component 130 controls the pressing component 120 to move to press the workpiece W, particularly press the workpiece W from the convex side of the workpiece W to fix the workpiece W between the abutting component 110 and the pressing component 120. Thus, by disposing the abutting component 110 at the concave side of the workpiece W, the workpiece W may be pre-positioned more readily and accurately, and by disposing the pressing component 120 at the convex side of the workpiece W, the workpiece W may be pressed and fixed more readily. However, the invention does not limit the relative positions of the abutting component 110, the pressing component 120, and the workpiece W having the U-shaped cross-section, and the specific structures of the abutting component 110 and the pressing component 120 may be adjusted according to the size and structure of the workpiece W (for example, the size ratio of the face portion S and the corner portion R, etc.) For example, when the structure of the workpiece W is more complicated, the abutting component 110 and the pressing component 120 may be configured as more movable components and the configuration positions and the arrangement methods may be adjusted to abut and press the workpiece W more effectively. The invention is not limited thereto and may be adjusted according to requirements.

Furthermore, in the present embodiment, as shown in FIG. 1, in a case in which the abutting component 110 is moved to abut the workpiece W, the control component 130 first controls the corner portion pressing component 124 to move to press the corner portion R, so that the corner portion R is fixed between the corresponding abutting component 110 (for example, the abutting component 110 located at the relative two outer sides in the plurality of abutting components 110) and the corner portion pressing component 124, and then controls the face portion pressing component 122 to move to press the face portion S, so that the face portion S is fixed between the corresponding abutting component 110 (for example, the abutting component 110 located at the relative two outer sides and the abutting component 110 located at the center in the plurality of abutting components 110) and the face portion pressing component 122. Here, the workpiece W is bonded via a friction stir welding (FSW) process to bond the workpiece W fixed between the abutting component 110 and the pressing component 120 (for example, the friction stir welding is performed on the cross-sections of the two workpieces W connected to each other), but is not limited thereto.

It may be seen that in the present embodiment, the bonding device 100 is used to bond the workpiece W having the U-shaped cross-section and having the face portion S and the corner portion R. Furthermore, since the substantially flat face portion S is easier to press than the curved corner portion R, the bonding device 100 preferentially presses the corner portion R of the workpiece W during the bonding process to eliminate the gap at the corner portion R, and then presses the face portion S of the workpiece W in a state in which the corner portion R is pressed and fixed. In this way, the gap generated at the corner portion R of the workpiece W may be significantly reduced, thereby facilitating bonding. Accordingly, the bonding device 100 may improve the bonding effect of the workpiece W.

Furthermore, in the present embodiment, as shown in FIG. 1, the pressing component 120 further includes a lateral pressing component 126 pressing a portion P of the face portion S of the workpiece W close to the corner portion R (e.g., a portion of an upper surface S1 close to the corner portion R). In this way, the sequence of the control component 130 controlling the pressing component 120 to move includes: first controlling the corner portion pressing component 124 to move to press the corner portion R, then controlling the lateral pressing component 126 to move to press the portion P in the face portion S close to the corner portion R, and lastly controlling the face portion pressing component 122 to move to press other portions of the face portion S. Furthermore, the face portion pressing component 122 includes an upper surface pressing component 122A pressing the upper surface S1 in the face portion S, and a side surface pressing component 122B pressing the side surface S2 in the face portion S. Thus, the sequence of the control component 130 controlling the face portion pressing component 122 to move includes: first controlling the upper surface pressing component 122A to move to press the upper surface S1, and then controlling the side surface pressing component 122B to move to press the side surface S2. Furthermore, the upper surface pressing component 122A includes a peripheral upper surface pressing component 122A1 close to the periphery of the upper surface S1 and close to the corner portion R, and a central upper surface pressing component 122A2 close to the center of the upper surface S1. Thus, the sequence of the control component 130 controlling the upper surface pressing component 122A to move includes: first controlling the peripheral upper surface pressing component 122A1 to move to press a peripheral portion P1 of the upper surface S1, and then controlling the central upper surface pressing component 122A2 to move to press a central portion P2 of the upper surface S1.

It may be seen that, in the present embodiment, the sequence of the control component 130 controlling the pressing component 120 to move is as follows. First, in the first step, the control component 130 controls the corner portion pressing component 124 to move to press the corner portion R. Next, in the second step, the control component 130 controls the lateral pressing component 126 to move to press the portion P in the face portion S close to the corner portion R. Next, in the third step, the control component 130 controls the upper surface pressing component 122A in the face portion pressing component 122 to move to press the upper surface S1 in the face portion S, wherein the control component 130 first controls the peripheral upper surface pressing component 122A1 in the upper surface pressing component 122A to move to press the peripheral portion P1 of the upper surface S1, and then controls the central upper surface pressing component 122A2 in the upper surface pressing component 122A to move to press the central portion P2 of the upper surface S1. Lastly, in the fourth step, the control component 130 controls the side surface pressing component 122B in the face portion pressing component 122 to move to press the side surface S2 in the face portion S. It should be noted that, in the friction stir welding, the two members are also pressed and fixed in the direction of the paper surface of FIG. 2 to align the bonding surfaces of the two members.

Via the above arrangement, in the bonding device 100 of the present embodiment, the pressing component 120 presses the workpiece W in the sequence of the corner portion R (pressed by the corner portion pressing component 124), the portion P in the face portion S close to the corner portion R (pressed by the lateral pressing component 126), the peripheral portion P1 of the upper surface S1 in the face portion S (pressed by the peripheral upper surface pressing component 122A1), the central portion P2 of the upper surface S1 in the face portion S (pressed by the central upper surface pressing component 122A2), and the side surface S2 in the face portion S (pressed by the side surface pressing component 122B), so that the bonding device 100 may preferentially eliminate the gap at the corner portion R and the portion P close to the corner portion R, and press in sequence from the peripheral portion P1 of the upper surface S1 in the face portion S to the central portion P2, and lastly press the smaller side surface S2 in the face portion S. In this way, the gap generated at the corner portion R of the workpiece W may be significantly reduced, thereby improving the bonding effect of the workpiece W.

Although the example in which the upper surface pressing component 122A includes the peripheral upper surface pressing component 122A1 and the central upper surface pressing component 122A2 and controls the two separately is used for explanation, in other embodiments not shown, the control component 130 may simultaneously control the movement of the plurality of upper surface pressing components 122A to simultaneously press the upper surface S1 (i.e., without distinguishing between the peripheral upper surface pressing component 122A1 and the central upper surface pressing component 122A2), or only a single upper surface pressing component 122A may also be disposed in the bonding device 100. Correspondingly, in other embodiments not shown, if the side surface S2 of the workpiece W is also configured to be larger in size like the upper surface S1, the bonding device 100 may also be configured with a plurality of side surface pressing components 122B and control the plurality of side surface pressing components 122B separately or simultaneously. In addition, in other embodiments not shown, the control component 130 may simultaneously control the upper surface pressing component 122A and the side surface pressing component 122B to move to press the upper surface S1 and the side surface S2 simultaneously. Alternatively, the control component 130 may first control the side surface pressing component 122B to move to press the side surface S2, and then control the upper surface pressing component 122A to move to press the upper surface S1, or only a single face portion pressing component 122 (the upper surface pressing component 122A or the side surface pressing component 122B) may also be disposed in the bonding device 100. Alternatively, the lateral pressing component 126 may also be omitted. The invention is not limited thereto and may be adjusted according to requirements.

Please refer to FIG. 3. In the present embodiment, the bonding method is used to bond the workpiece W having the U-shaped cross-section and having the face portion S and the corner portion R, and includes an abutting step S01 and a pressing step S02. The workpiece W is, for example, a casing of a battery pack. In the abutting step S01, the workpiece W is abutted in the first direction D1. In the pressing step S02, the workpiece W is pressed in the second direction D2 different from the first direction D1, thereby fixing the workpiece W. In particular, the abutting step S01 is performed to abut the workpiece W, and in a state in which the abutting step S01 is performed, the pressing step S02 is performed to press the workpiece W. Furthermore, the sequence of performing the pressing step S02 includes: first pressing the corner portion R, and then pressing the face portion S. Here, the workpiece W is bonded via the friction stir welding process, but is not limited thereto. Here, the bonding method is, for example, performed by the bonding device 100, wherein the abutting step S01 is, for example, performed by the abutting component 110, the pressing step S02 is, for example, performed by the pressing component 120, and the movement (abutting and pressing) of the abutting component 110 and the pressing component 120 is, for example, controlled by the control component 130. Furthermore, in the pressing step S02, the step of pressing the corner portion R is performed by, for example, the corner portion pressing component 124, and in the pressing step S02, the step of pressing the face portion S is performed by, for example, the face portion pressing component 122. For the description of the abutting component 110, the pressing component 120, and the control component 130 in the bonding device 100, reference may be made to the above contents and FIG. 1 and FIG. 2.

It may be seen that in the present embodiment, the bonding method is used to bond the workpiece W having the U-shaped cross-section and having the face portion S and the corner portion R. Furthermore, since the substantially flat face portion S is easier to press than the curved corner portion R, the bonding method preferentially presses the corner portion R of the workpiece W during the bonding process to eliminate the gap at the corner portion R, and then presses the face portion S of the workpiece W in a state in which the corner portion R is pressed and fixed. In this way, the gap generated at the corner portion R of the workpiece W may be significantly reduced, thereby facilitating bonding. Accordingly, the bonding method may improve the bonding effect of the workpiece W.

Furthermore, in the present embodiment, as shown in FIG. 1 and FIG. 3, the sequence of performing the pressing step S02 includes: first pressing the corner portion R (for example, performed by the corner portion pressing component 124), then pressing the portion P in the face portion S close to the corner portion R (for example, performed by the lateral pressing component 126), and lastly pressing other portions of the face portion S (for example, performed by the face portion pressing component 122). In addition, the sequence of performing the step of pressing the face portion S includes: first pressing the upper surface S1 (for example, performed by the upper surface pressing component 122A), and then pressing the side surface S2 (for example, performed by the side surface pressing component 122B). Furthermore, the sequence of performing the step of pressing the upper surface S1 includes: first pressing the peripheral portion P1 of the upper surface S1 (for example, performed by the peripheral upper surface pressing component 122A1), and then pressing the central portion P2 of the upper surface S1 (for example, performed by the central upper surface pressing component 122A2).

Via the above arrangement, in the bonding method of the present embodiment, the pressing of the workpiece W in the pressing step S02 is performed in the sequence of the corner portion R (pressed by the corner portion pressing component 124), the portion P in the face portion S close to the corner portion R (pressed by the lateral pressing component 126), the peripheral portion P1 of the upper surface S1 in the face portion S (pressed by the peripheral upper surface pressing component 122A1), the central portion P2 of the upper surface S1 in the face portion S (pressed by the central upper surface pressing component 122A2), and the side surface S2 in the face portion S (pressed by the side surface pressing component 122B), so that the bonding method may preferentially eliminate the gap at the corner portion R and the portion P close to the corner portion R, and press in sequence from the peripheral portion P1 of the upper surface S1 in the face portion S to the central portion P2, and lastly press the smaller side surface S2 in the face portion S. In this way, the gap generated at the corner portion R of the workpiece W may be significantly reduced, thereby improving the bonding effect of the workpiece W.

Although the bonding method of the present embodiment is described by using the bonding device 100 as an example, the invention does not limit the bonding method to be performed by the bonding device 100, and other bonding devices that may perform the abutting step S01 and the pressing step S02 and control the sequence of the steps may also be used to perform the bonding method. The invention is not limited thereto and may be adjusted according to requirements.

In the bonding device according to an embodiment of the invention, the pressing component further includes a lateral pressing component pressing a portion in the face portion of the workpiece close to the corner portion. Furthermore, a sequence of the control component controlling the pressing component to move includes: first controlling the corner portion pressing component to move to press the corner portion, then controlling the lateral pressing component to move to press the portion in the face portion close to the corner portion, and lastly controlling the face portion pressing component to move to press other portions of the face portion.

In the bonding device according to an embodiment of the invention, the face portion pressing component includes an upper surface pressing component pressing an upper surface in the face portion, and a side surface pressing component pressing a side surface in the face portion. Furthermore, a sequence of the control component controlling the face portion pressing component to move including: first controlling the upper surface pressing component to move to press the upper surface, and then controlling the side surface pressing component to move to press the side surface.

In the bonding device according to an embodiment of the invention, the upper surface pressing component includes a peripheral upper surface pressing component close to a periphery of the upper surface and close to the corner portion, and a central upper surface pressing component close to a center of the upper surface. Furthermore, a sequence of the control component controlling the upper surface pressing component to move includes: first controlling the peripheral upper surface pressing component to move to press the peripheral portion of the upper surface, and then controlling the central upper surface pressing component to move to press a central portion of the upper surface.

In the bonding device according to an embodiment of the invention, the workpiece is bonded by a friction stir welding process.

In the bonding method according to an embodiment of the invention, a sequence of performing the pressing step includes: first pressing the corner portion, then pressing a portion in the face portion close to the corner portion, and lastly pressing other portions of the face portion.

In the bonding method according to an embodiment of the invention, a sequence of performing the step of pressing the face portion includes: first pressing an upper surface, and then pressing a side surface.

In the bonding method according to the embodiment of the invention, a sequence of performing the step of pressing the upper surface includes: first pressing a peripheral portion of the upper surface, and then pressing a central portion of the upper surface.

In the bonding method according to an embodiment of the invention, the workpiece is bonded by a friction stir welding process.

Based on the above, in the bonding device and the bonding method of the invention, in the state in which the abutting component is moved to abut the workpiece (the abutting step is performed), the control component controls the pressing component to move to press the workpiece (perform the pressing step). Furthermore, the sequence of the control component controlling the pressing component to move (perform the pressing step) includes: first controlling the corner portion pressing component to move to press the corner portion, and then controlling the face portion pressing component to move to press the face portion. Therefore, it may be seen that the bonding device and the bonding method are used to bond the workpiece having the U-shaped cross-section and having the face portion and the corner portion, and during the bonding process, the corner portion of the workpiece is pressed first to eliminate the gap at the corner portion, and then the face portion of the workpiece is pressed in the state in which the corner portion is pressed and fixed. In this way, the gap generated at the corner portion of the workpiece may be significantly reduced, thereby facilitating bonding. Preferably, the bonding device and the bonding method preferentially press the portion in the face portion close to the corner portion during the process of pressing the face portion, for example, pressing in sequence from the corner portion, the portion in the face portion close to the corner portion, the peripheral portion of the face portion, and toward the central portion of the face portion, thereby further improving the bonding effect of the workpiece. Accordingly, the bonding device and the bonding method of the invention may improve the bonding effect of the workpiece.

Lastly, it should be noted that the above embodiments are used to describe the technical solution of the invention instead of limiting it. Although the invention has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the invention.

What is claimed is:

1. A bonding device, for bonding a workpiece having a U-shaped cross-section and having a face portion and a corner portion, and comprising:

an abutting component abutting the workpiece in a first direction;

a pressing component pressing the workpiece in a second direction different from the first direction, thereby fixing the workpiece; and a control component controlling the abutting component and the pressing component, wherein the pressing component comprises a face portion pressing component pressing the face portion of the workpiece and a corner portion pressing component pressing the corner portion of the workpiece, the control component controls the abutting component to move to abut the workpiece, and controls the pressing component to move to press the workpiece in a state in which the abutting component is moved, and a sequence of the control component controlling the pressing component to move comprises:

first controlling the corner portion pressing component to move to press the corner portion, then controlling the face portion pressing component to move to press the face portion.

2. The bonding device of claim 1, wherein, the pressing component further comprises a lateral pressing component pressing a portion in the face portion of the workpiece close to the corner portion, and a sequence of the control component controlling the pressing component to move comprises:

first controlling the corner portion pressing component to move to press the corner portion, then controlling the lateral pressing component to move to press a portion in the face portion close to the corner portion, lastly controlling the face portion pressing component to move to press other portions of the face portion.

3. The bonding device of claim 2, wherein, the face portion pressing component comprises an upper surface pressing component pressing an upper surface in the face portion, and a side surface pressing component pressing a side surface in the face portion, and a sequence of the control component controlling the face portion pressing component to move comprises:

first controlling the upper surface pressing component to move to press the upper surface, then controlling the side surface pressing component to move to press the side surface.

4. The bonding device of claim 3, wherein, the upper surface pressing component comprises a peripheral upper surface pressing component close to a periphery of the upper surface and close to the corner portion, and a central upper surface pressing component close to a center of the upper surface, and a sequence of the control component controlling the upper surface pressing component to move comprises:

first controlling the peripheral upper surface pressing component to move to press a peripheral portion of the upper surface, then controlling the central upper surface pressing component to move to press a central portion of the upper surface.

5. The bonding device of claim 1, wherein, the workpiece is bonded via a friction stir welding process.

* * * * *